(12) United States Patent  
Hale et al.

(10) Patent No.: US 8,941,784 B2  
(45) Date of Patent: Jan. 27, 2015

(54) EASY RF REMOTE CONTROL PAIRING FOR NETWORKED SET TOP BOXES

(75) Inventors: Nathan Hale, Denver, CO (US); Adam Schafer, Littleton, CO (US); Jeremy Mickelsen, Denver, CO (US); David Innes, Littleton, CO (US); William Reams, Engelwood, CO (US)

(73) Assignee: Echostar Technologies L.L.C., Englewood, CO (US)

( * ) Notice: Subject to any disclaimer, the term of this patent is extended or adjusted under 35 U.S.C. 154(b) by 214 days.

(21) Appl. No.: 13/224,143

(22) Filed: Sep. 1, 2011

(65) Prior Publication Data

US 2013/0057778 A1   Mar. 7, 2013

(51) Int. Cl.
*H04N 5/44* (2011.01)
*H04N 21/422* (2011.01)

(52) U.S. Cl.
CPC ... *H04N 21/42207* (2013.01); *H04N 21/42221* (2013.01); *H04N 2005/4442* (2013.01)
USPC ........... 348/734; 348/114; 725/131; 725/139; 725/151

(58) Field of Classification Search
USPC ........................................................ 348/734
See application file for complete search history.

(56) References Cited

U.S. PATENT DOCUMENTS

| | | | |
|---|---|---|---|
| 6,529,556 B1 * | 3/2003 | Perdue et al. | 375/260 |
| 8,004,389 B1 | 8/2011 | Mui | |
| 2009/0021651 A1 * | 1/2009 | Pratt et al. | 348/734 |
| 2010/0052870 A1 * | 3/2010 | King | 340/286.02 |
| 2010/0328132 A1 * | 12/2010 | Reams et al. | 341/176 |
| 2011/0077751 A1 | 3/2011 | Redi | |
| 2011/0115985 A1 * | 5/2011 | Beals | 348/734 |
| 2011/0157469 A1 | 6/2011 | McRae et al. | |

FOREIGN PATENT DOCUMENTS

JP        2011061669 A    3/2011

OTHER PUBLICATIONS

International Search Report dated Jan. 7, 2013 from International Application No. PCT/US2012/053162 (2 pages).

\* cited by examiner

*Primary Examiner* — Jefferey Harold  
*Assistant Examiner* — Samira Monshi  
(74) *Attorney, Agent, or Firm* — Seed IP Law Group PLLC

(57) ABSTRACT

A television service provider system includes a first set top box, a second set top box, and a remote control. The remote control transmits an infrared pairing signal which is only received by one of the set top boxes. The receiving set top box pairs itself to the remote control. The non receiving set top box is not paired to the remote control. The remote control then transmits control signals to operate the receiving set top box. The control signals are received by both set top boxes, but are executed only by the set top box that is paired to the remote control.

18 Claims, 8 Drawing Sheets

EASY RF REMOTE CONTROL PAIRING FOR NETWORKED SET TOP BOXES

BACKGROUND

1. Technical Field

The present disclosure relates to the field of wirelessly controlling a controlled unit. The present disclosure more particularly relates to a device, method, and system for controlling a set top box.

2. Description of the Related Art

Many television service providers, such as satellite and cable television providers, provide customers with multiple set top boxes in their homes. This allows customers to couple each set top box to a respective television. Often these televisions are in different rooms so that people in different rooms can watch different programs.

Each set top box is typically accompanied by a separate remote control. In some systems each remote control may be specifically programmed to only control a particular set top box. In other systems each remote control may control either set top box depending on which room the remote control is in. In some systems it is generally not desirable to have one remote control simultaneously control two set top boxes as the user of one set top box may erroneously change the channel of the set top box in use by another user.

In some systems the remote control issues control signals which will only be received by a set top box that has a "line of sight" path to the remote control emitter (e.g. infrared emitter). In this way one remote control will only control a set top box that is in the same room as the remote control. However this raises the problem that the remote control functions poorly if there is an obstruction between the remote control and the set top box, such as another person, a piece of furniture, or a blanket.

BRIEF SUMMARY

One embodiment of the present invention is a system that includes a remote control, a first set top box, and at least a second set top box. Upon receiving input from a user, the remote control will transmit a "line of sight" pairing signal to a set top box in proximity to the remote control, for example the first set top box. When the first set top box receives the pairing signal, the set top box configures itself to accept subsequent control signals from the remote control. The control signals are for example the commands from the remote control to change the channel on the set top box, or to activate the DVR, etc. The control signals are transmitted in a frequency band that does not require a line of sight path in order to be received by the first set top box, for example in a radio frequency band.

Since the control signals are issued in a frequency band that does not require a line of sight path to the remote control, the second set top box may receive the control signals intended for the first set top box even if the second set top box is in a different room. Therefore, when the first set top box receives the pairing signal, the first set top box transmits an unpairing signal or a "do not pair" to the second set top box indicating that the first set top box is now paired to the remote control. Because the second set top box has received the unpairing signal from the first set top box indicating that the first set top box is paired to the remote control, the second set top box will not respond to the control signals from the remote control.

Subsequently, the user may bring the remote control in proximity to the second set top box and desire to control the second set top box with the same remote. Upon input to that effect from the user, the remote control will issue the line of site pairing signal to the second set top box. Upon reception of the pairing signal by the second set top box, the second set top box will transmit an unpairing signal to the first set top box indicating that the second set top box is now paired to the remote control. This will cause the first set top box to become unpaired with the remote control. The second set top box will now respond to the control signals from the remote control while the first set top box will no longer respond to the control signals.

In such a way the user may press a single button on the remote control to pair one set top box to the remote control while unpairing another set top box from the remote control. If there are multiple remote controls with the system, each remote control may be used interchangeably with the set top boxes, but each can be set to control one set top box at a time.

Alternatively, if there are multiple set top boxes, the unpairing signal may be selectively configured to unpair only some, but not all of the set top boxes. For example, if there are ten set top boxes, the remote may be paired to a subgroup of these, for example, seven of them, and unpaired from the rest. Subsequently, it can be paired to a different group, such as three or five set top boxes, and unpaired from the rest.

Thus the remote control may be paired to control banks of dozens of set top boxes within its range, and unpaired from any other set top boxes which it is desired to not control even though they are within its range.

DETAILED DESCRIPTION

Figure 1:
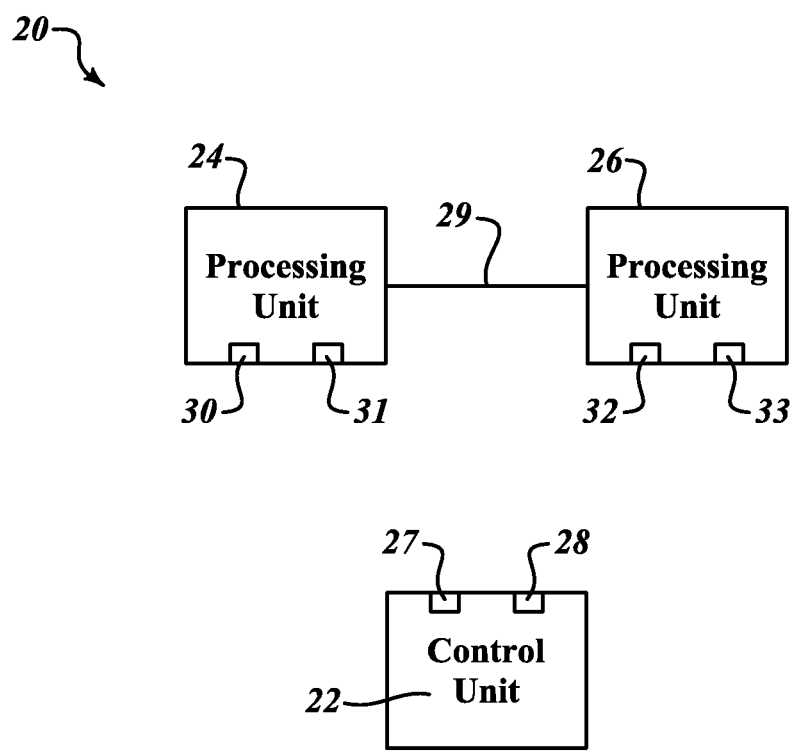
FIG. 1 is a block diagram of a remote control system according to one embodiment.

FIG. 1 illustrates a system 20 according to one embodiment in which a control unit 22 is configured to control a first processing unit 24 and a second processing unit 26. The control unit 22 includes first and second wireless transmitters 27, 28. The first wireless transmitter 27 is configured to transmit line of sight wireless signals to the first processing unit 24 and the second processing unit 26 when a line of sight path exists between the control unit 22 and the first or second processing units 24, 26. The second wireless transmitter 28 is configured to transmit wireless signals to the second first and second processing units regardless of a line of sight path between the remote control and first and second processing units 24, 26.

The first processing unit 24 includes a line of sight receiver 30 for receiving line of sight wireless signals from the control unit 22. The first processing unit 24 includes a non-line of sight receiver 31 for receiving the non-line of sight wireless signals from the control unit 22. The second processing unit 26 includes a line of sight receiver 32 and a non-line of sight receiver 33 for receiving the respective line of sight and non-line of sight wireless signals from the control unit 22. The first processing unit 24 is coupled to the second processing unit 26 by a link 29 by which the processing units 24, 26 can communicate with each other.

The control unit 22 is capable of issuing signals in two frequency bands. In particular the first transmitter 27 transmits signals in a first frequency band which requires a "line of sight" path between the control unit 22 and one of the processing units 24 or 26 in order for signals to be received by the desired processing unit 24 or 26. The second transmitter 28 transmits signals in a frequency band that does not require a line of sight between the control unit 22 and the desired processing unit 24 or 26.

In particular the control unit 22 issues a pairing signal in the first frequency band to either the first processing unit 24 or the second processing unit 26. For example, if a user desires to control the first processing unit 24, then the user positions the control unit 22 to establish a line of sight between the control unit 22 and the processing unit 24. The control unit issues the pairing signal in the first frequency band from the first transmitter 27, for example following the user pressing a specific remote control button or buttons. The pairing signal is received by the receiver 30 of the first processing unit 24. Upon receiving the pairing signal the first processing unit 24 registers that it is now paired to the control unit 22. The first processing unit also transmits a signal to the second processing unit 26 by means of the link 29. The second processing unit receives the signal from the first processing unit 24 and registers that the first processing unit 24 is paired to the control unit 22. If the second processing unit 26 was previously paired to the control unit 22, upon receiving the unpairing signal from the first processing unit 24 the second processing unit 26 unpairs itself from the control unit 22. In this way only one of the processing units 24, 26 is paired to the control unit 22 at any given time.

After being paired with the first processing unit 24, the control unit 22 then issues control signals by means of the second transmitter 28. The control signals are carried in a second frequency band which does not require a line of sight path. The first processing unit 24 and the second processing unit 26 both receive the control signals because the control signals do not require a line of sight path to be received. However, only the first processing unit 24 responds to the control signals by performing the commands contained in the control signals. The second processing unit 26 receives the control signals but does not respond to them by performing the commands in the control signals.

In one embodiment the first frequency band is an infrared frequency band. Signals issued in such a frequency band typically will be greatly attenuated or reflected by any obstructions between the control unit 22 and the first or second processing units 24, 26. Because of this the signals in the infrared frequency band are said to require a line of sight path between the control unit 22 and the processing unit 24, 26 in order to be received.

In one embodiment the second frequency band is a radio frequency band. Signals issued in the radio frequency band typically may pass through obstructions such as people, walls, or furniture without being greatly attenuated or reflected. Because of this the signals issued in the radio frequency band do not require a line of sight path between the control unit 22 and the first or second processing units 24, 26.

Thus after the line of sight pairing signal has been received by the first processing unit, subsequent control signals are issued in the second frequency band. This enables the control signals to be received by the first processing unit 24 even if there are obstructions between the control unit 22 and the first processing unit 24.

The control unit 22 may be any type of a remote control, or any device that issues wireless commands to control another device. The processing units 24, 26 may be set top boxes, televisions, remote control vehicles, dvd players, stereo systems, or any other device that receives wireless commands from a remote control.

While the link 29 has been illustrated as a physical connection, for example a wire, the link may be any kind of connection that permits communication between the first and second processing units 24, 26. For example the link 29 may be a wireless connection between the two processing units 24, 26, or the link 29 may include a third device to which both the processing units 24, 26 are connected either physically or wirelessly. The link 29 may include any suitable implementation that allows communication to be passed between the processing units 24, 26 either directly or indirectly.

In another embodiment, the line of sight signal is a precursor to the actual pairing signal which will be carried in a non-line of sight signal. The line of sight signal instead transmits a message informing the processing unit 24 or 26 that there will be a pairing signal to follow in the subsequent non line of sight signal. The processing unit 24 or 26 that receives the line of sight signal will be paired to the control unit 22 upon receiving the next non-line of sight signal (the actual pairing signal). Even though both processing units 24 or 26 receive the non-light of sight pairing signal, only the processing unit 24 or 26 that received the line of sight precursor signal will be paired to the control unit 22 upon receiving the non-line of sight pairing signal. Thus even in an embodiment in which the line of sight precursor signal precedes the actual pairing signal, the line of sight signal may also be termed a pairing signal.

Figure 2:
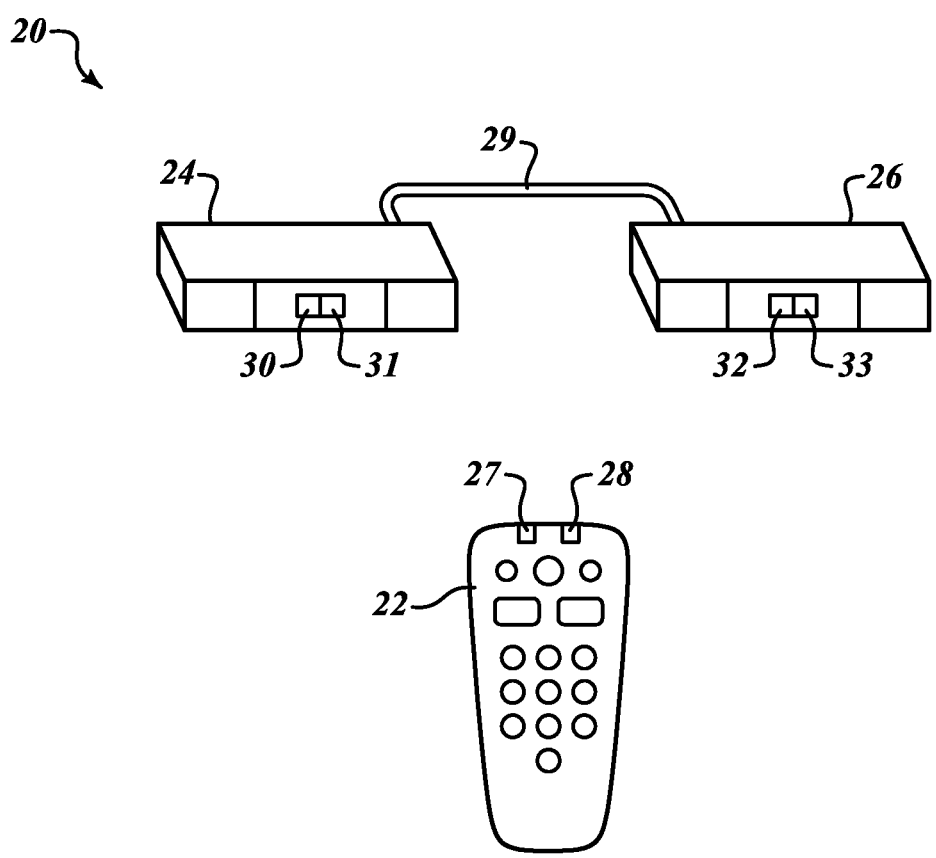
FIG. 2 illustrates a remote control and two processing units according to one embodiment.

FIG. 2 illustrates a system 20 according to one embodiment. The system 20 includes a remote control 22, a first set top box 24, and a second set top box 26. The remote control 22 includes a transmitter 28 configured to transmit wireless signals to the first and second set top boxes 24, 26. The first set top box 24 includes a wireless receiver 30 configured to receive the wireless signals from the remote control 22. The second set top box 26 includes a wireless receiver 32 configured to receive the wireless signals from the remote control 22. The first set top box 24 is connected to the second set top box 26 by a link 29. The link 29 may be a wired connection, a wireless connection, a mutual connection to an intermediate device (not shown) such as a satellite dish, or any other type of link that allows direct or indirect communication between the first set top box 24 and the second set top box 26.

The first and second set top boxes 24, 26 are shown in FIG. 2 in close proximity and not connected to any other devices. In practice each set top box 24, 26 would be connected to a respective television (not shown) and located in separate rooms (though not necessarily). Each set top box 24, 26 provides television programming to the television to which it is connected.

When a user of the system 20 desires to control the first set top box 24, the user inputs a command to the remote control 22, for example by pushing a button on the remote control 22. The remote control 22 issues a pairing signal in an infrared frequency band. Because the pairing signal is an infrared signal, the remote control 22 must have a line of sight path to the first set top box 24 in order for the first set top box 24 to receive the pairing signal.

When the first set top box 24 receives the pairing signal the first set top box 24 registers that it is paired to the remote control 22. The first set top box 24 also transmits an unpairing signal to the second set top box 26 via the link 29. When the second set top box 26 receives the unpairing signal it registers that the first set top box 24 is now paired to the remote control 22. If the second set top box 26 was previously paired to the remote control 22 then upon receiving the unpairing signal the second set top box 26 unpairs itself from the remote control 22.

The remote control 22 then transmits radio frequency control signals in response to user input, for example to change the channel of the first set top box 24 or to play recorded content from a DVR associated with the first set top box 24. Because the control signals are issued in a radio frequency, there does not need to be a line of sight path between the remote control 22 and the first or second set top box 24, 26 in order to be received by the first or second set top box 24, 26. In fact it is probable that both the first and second set top boxes 24, 26 will receive the control signals. However, because only the first set top box 24 is paired to the remote control 22, only the first set top box 24 will respond to commands from the remote control 22. The second set top box 26 will receive the control signals but will not respond to them.

This system 20 allows for a user to control a set top box 24, 26 in one room while other users can use a set top box in a separate room without interference. For this reason there can be as many remote controls 22 as there are set top boxes 24, 26. Any remote control 22 can be taken to any set top box 24, 26 and immediately be paired to that set top box 24, 26 and unpaired from the other set top box 26, 24. Furthermore, once a remote control 22 is paired to a set top box 24, 26, control signals can reach the desired set top box despite obstructions that may be in the way, for example other people, a blanket, furniture, etc.

In another embodiment, the infrared pairing signal is a precursor to an RF pairing signal. The infrared pairing signal instead transmits a message informing the processing unit 24 or 26 that there will be a radio frequency pairing signal following the infrared pairing signal. The set top box 24 or 26 that receives the infrared signal will be paired to the remote control 22 upon receiving the radio frequency pairing signal. Even though both set top boxes 24, 26 receive the radio frequency pairing signal, only the set top box 24 or 26 that receives the infrared pairing signal will be paired to the remote control 22 upon receiving the radio frequency pairing signal.

Figure 3A:
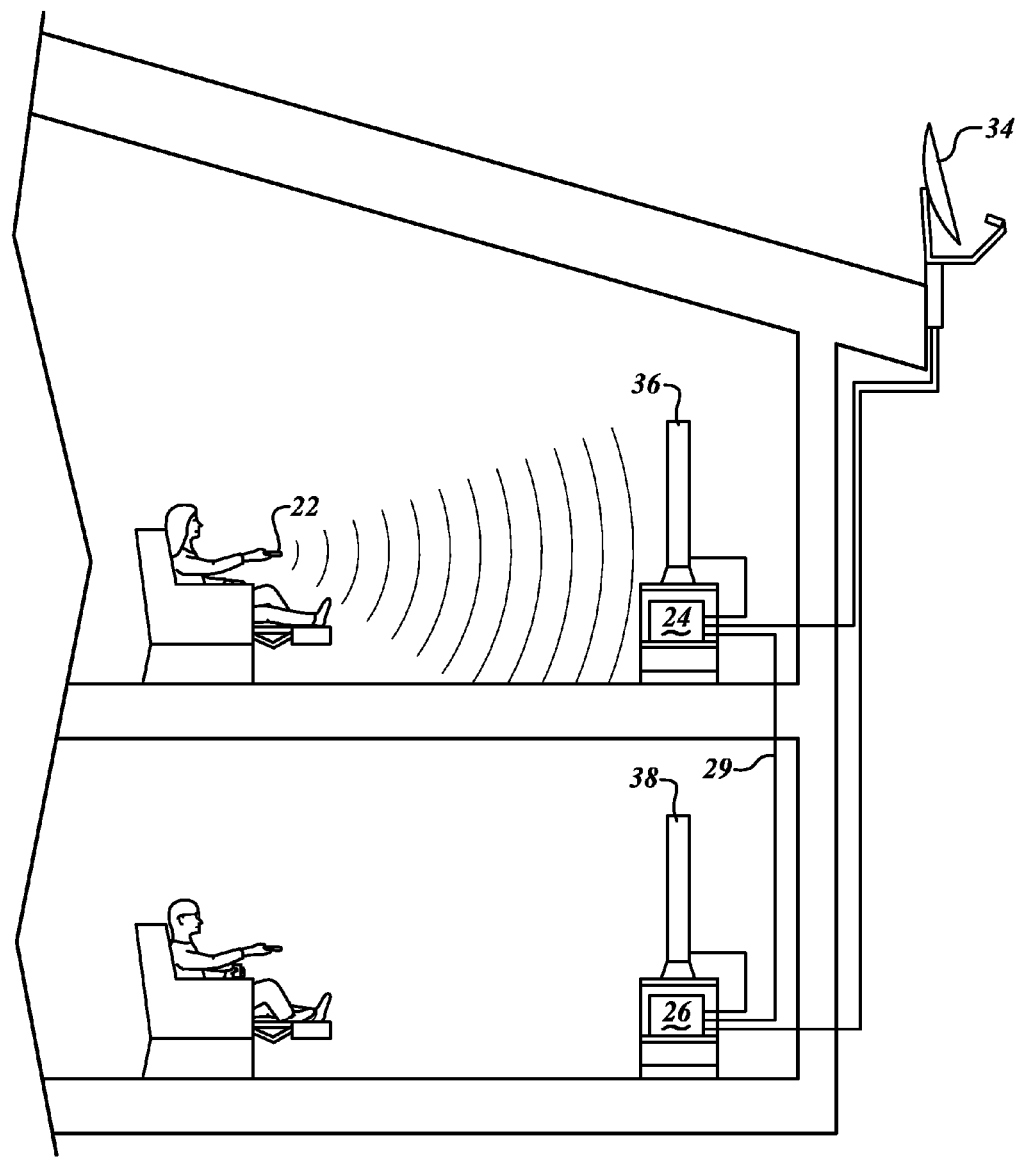
FIGS. 3A-3B illustrate a home including two set top boxes and a remote control according to one embodiment.
Figure 3B:
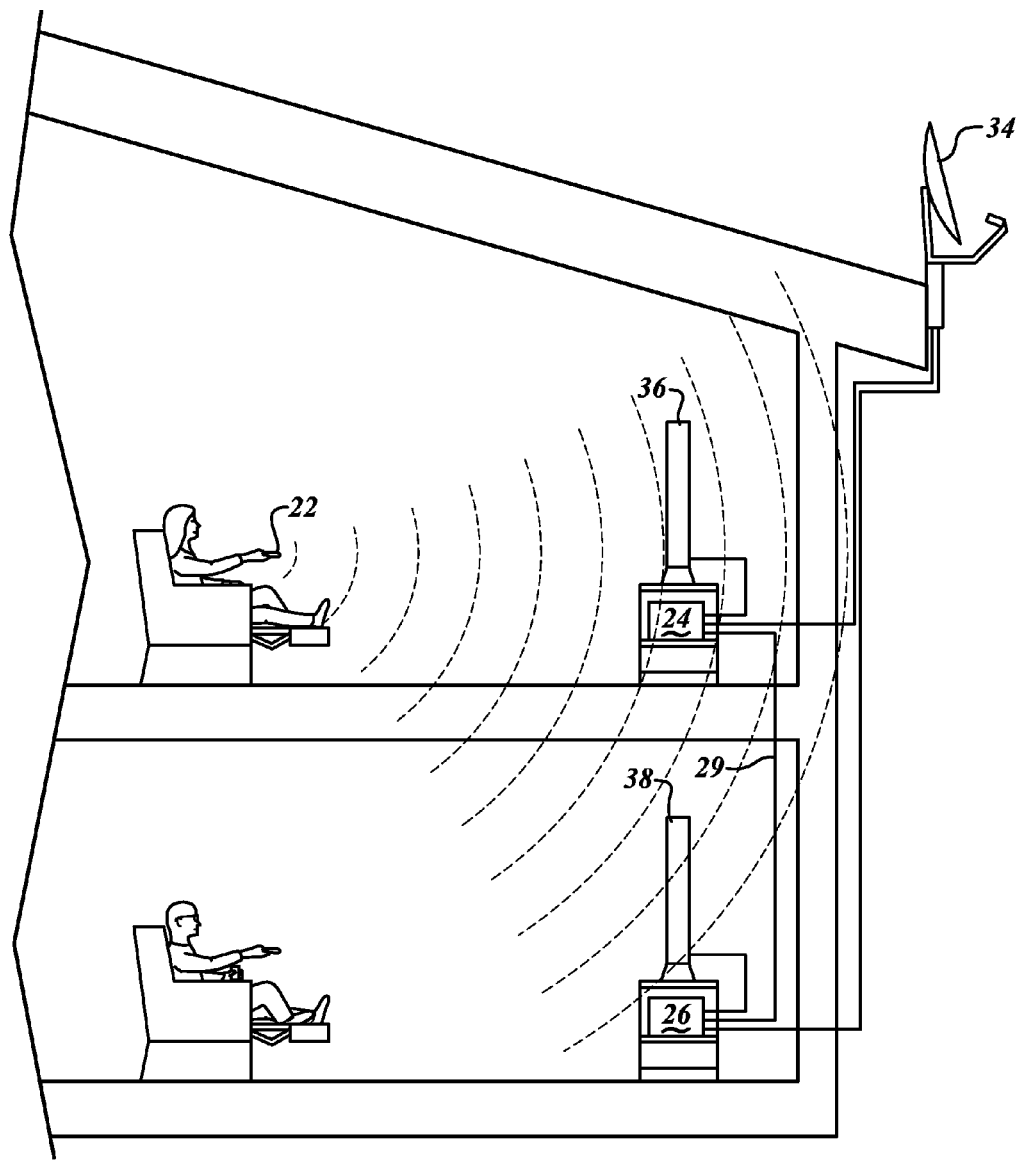

FIGS. 3A, 3B illustrate an embodiment of a system 20 according to one embodiment. In FIG. 3A two set top boxes 24, 26 are located in separate rooms of a house and connected to a satellite dish 34. The set top boxes 24, 26 each receive television programming signals from the satellite dish 34. The set top boxes 24, 26 are connected to each other with a link 29. While the link 29 is shown as a wire connecting the first and second set top boxes 24, 26, in FIG. 3A, the set top boxes 24, 26 may in fact be coupled to each other only through the satellite dish 34, or wirelessly, or in any other suitable manner. The first set top box 24 is connected to a television 36. The second set top box is connected to a television 38. The set top boxes 24, 26 output video and audio signals to the televisions 36, 38 which output the images and sounds of the programming.

As can be seen in FIG. 3A, a user is operating the remote control 22. The remote control is emitting the infrared pairing signal to the first set top box 24. The infrared pairing signal is attenuated when it hits the floor and does not pass through to the second set top box 26. In this way only the first set top box 24 receives the infrared pairing signal from the remote control 22.

When the first set top box 24 receives the infrared pairing signal the first set top box 24 registers in an internal memory (not shown) that it is now paired to the remote control 22. The first set top box 24 sends an unpairing signal to the second set top box 26 via the link 29. The unpairing signal indicates to the second set top box 26 that the first set top box 24 is paired to the remote control 22. In response to the signal the second set top box 26 registers in an internal memory (not shown) that the first set top box 24 is paired to the remote control 22. The second set top box 26 also registers in the internal memory that it is not paired to the remote control 22.

FIG. 3B illustrates the same system as in FIG. 3A, but the remote control 22 is now emitting a radio frequency control signal. The radio frequency control signal is received by the first set top box 24. Because the first set top box 24 is paired to the remote control 22, the first set top box 24 responds to the control signal by following the instructions in the control signal. The control signal may include instructions to change the channel currently being viewed, to rewind, pause, or fast forward currently displayed content, or to active a DVR associated with the first set top box 24.

As can be seen in FIG. 3B the radio frequency control signal is not significantly attenuated by the floor and thus passes through to the second set top box 26 as well. The second set top box 26 receives the control signal but does not respond to the control signal because the second set top box 26 is not paired to the remote control 22.

FIG. 3B also illustrates a second user holding a second remote control. In practice there may or may not be a second remote control. In one embodiment there is a separate remote control for each set top box 24, 26. If there are multiple remote controls, then either remote control may be paired to either set top box 24, 26. A pairing request from the remote control 22 to the first set top box 24 will unpair any previously paired remote control from the first set top box 24. In this way the remote controls do not need to be kept in a particular room with a particular set top box. Instead any remote control can be used to control any set top box.

The infrared pairing signal may be issued in response to input from the user or it may be issued automatically. In one embodiment the infrared pairing signal is issued when a user presses a designated key on the remote control, for example the device key designated for controlling the set top box 24 as opposed to the television. Of course in other embodiments the infrared pairing signal can be issued in response to any other suitable input from the user.

The embodiments illustrated in FIGS. 3A, 3B are given by way of non-limiting example. The frequency bands of the transmitted signals may be other than infrared or radio frequency bands. The remote control may be paired to one of the set top boxes in any suitable manner and not necessarily by means of an infrared pairing signal as will be apparent to those of skill in the art in light of the present disclosure.

Televisions typically have programming codes that may be programmed into remote controls. When a remote control has the correct television programming code the remote control can be used to operate the television. In one embodiment the first and second set top boxes 24, 26 each store programming codes for their respective television sets 36, 38. For example the first set top box 24 stores the programming code for television 36. When the remote control 22 is paired to the first set top box 24, the first set top box 24 transmits the programming code for the television 36 back to the remote control 22. The remote control receives the programming code and makes ready to control the television 36.

Likewise, the second set top box 26 stores the programming code for the television 38. When the remote control 22 is paired to the second set top box 26 the second set top box transmits the programming code for the television 38 to the remote control 22. The remote control is then ready to control the television 38.

In one embodiment each set top box 24, 26 stores programming codes for a respective DVD player, VCR, stereo system, or other peripheral devices. When the remote control 22 is paired with either set top box 24, 26, the remote control 22 can be automatically configured to control the correct peripheral devices.

In one embodiment the remote control 22 stores the programming codes for the televisions 36, 38, and other peripheral devices. When the remote control is paired to one of the set top boxes 24, 26 the set top box 24, 26 can transmit an identity code to the remote control 22. The remote control 22 can then activate the programming codes for the peripheral devices associated with that set top box identity code.

While FIGS. 3A, 3B illustrate a satellite television system 20, the system 20 may alternatively be a cable television system or other electronic system utilizing remote control of multiple devices.

Figure 4:
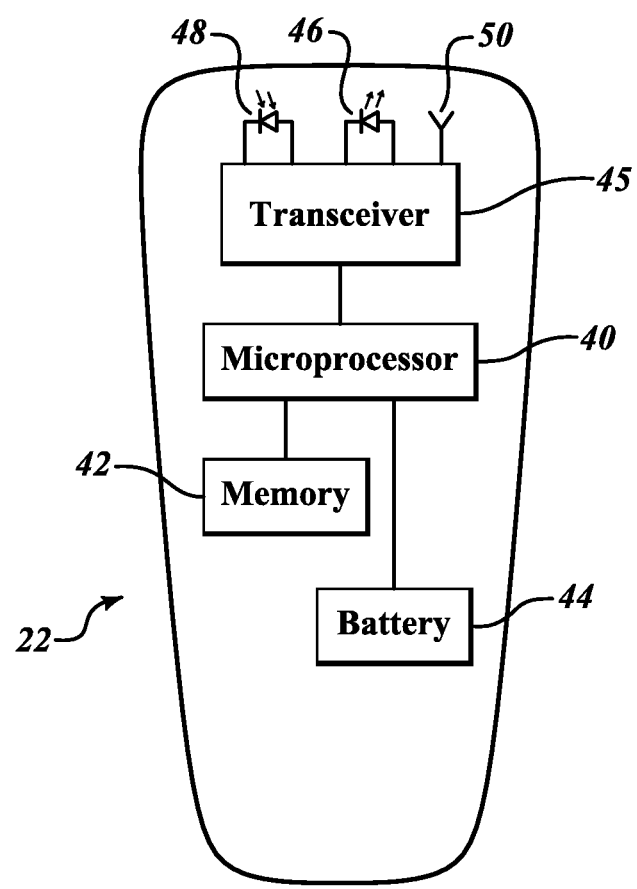
FIG. 4 is a block diagram of a remote control according to one embodiment.

FIG. 4 is a block diagram of a remote control 22 according to one embodiment. The remote control 22 includes a microprocessor 40. The microprocessor 40 receives input signals from remote control buttons (not shown) that can be pressed by the user. The microprocessor is coupled to a memory 42. The memory 42 may store data for execution of remote control functions. The memory 42 may also store programming codes for peripheral devices such as televisions, DVD players, VCRs, stereo systems, etc. The microprocessor 40 is coupled to a battery 44 which powers the microprocessor 40 and all of the other components of the remote control 22. The microprocessor 40 is also coupled to transceiver 28. The transceiver 28 contains an infrared transmitter 46 for transmitting infrared signals such as a pairing signal. The infrared transmitter 46 may be for example an infrared emitting diode configured to emit infrared radiation. The transceiver 28 also contains an infrared receiver 48 for receiving infrared signals. The infrared receiver may be for example an infrared photodiode sensitive to incident infrared radiation. The transceiver 28 further comprises a radio frequency antenna for transmitting radio frequency signals, for example set top box control signals as described in relation to FIGS. 2, 3A, 3B.

In practice the remote control 22 may have many other components. The components may also be connected differently than shown in FIG. 4. The block diagram of FIG. 4 is given only as a simplified illustration of some of the basic components of a remote control 22 according to one embodiment.

Figure 5:
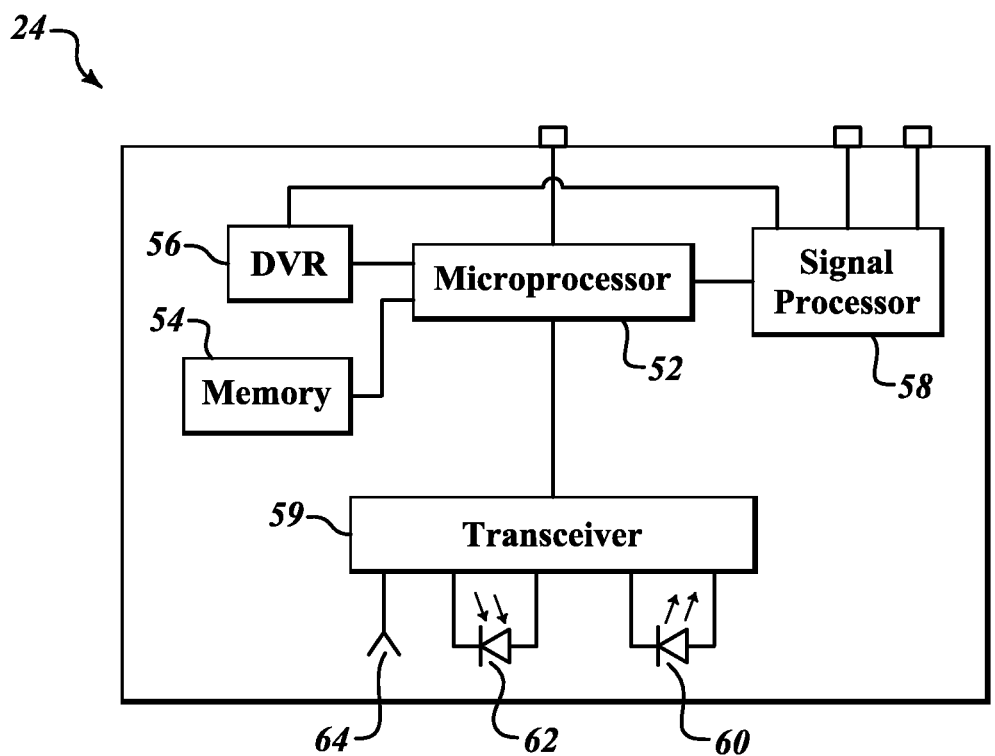
FIG. 5 is a block diagram of a processing unit according to one embodiment.

FIG. 5 illustrates a block diagram of a set top box 24 according to one embodiment. The set top box 24 includes a microprocessor 52. A memory 54 is coupled to the microprocessor 52. The memory 54 is configured to store operating instructions for the set top box 24. The memory 54 may also be configured to store programming codes as described in relation to FIGS. 3A, 3B. A DVR is also connected to the microprocessor 52 and receives instructions from the microprocessor 52. The DVR 56 stores data for recorded television programming and other recorded programming to be reproduced on a television 36. A signal processor 58 is also coupled to the microprocessor 52 and to the DVR 56. The signal processor may include a graphics processor, sound processor and other components for processing incoming programming information from a satellite dish 34 or the DVR 56. The signal processor can output audio and video signals to the television 36 or other entertainment center components (not shown).

Transceiver 30 is coupled to the microprocessor 52. The transceiver 30 includes an infrared transmitter 60 transmitting infrared signals to the remote control 22, an infrared receiver 62 for receiving infrared signals from the remote control 22, and a radio frequency antenna 64 for receiving radio frequency signals from the remote control 22. In one embodiment the infrared transmitter 60 is an infrared emitting diode configured to emit radiation in the infrared spectrum. In one embodiment the infrared receiver 62 is an infrared photodiode configured to be sensitive to incident infrared radiation.

The infrared receiver 62 is configured to receive an infrared pairing signal from the remote control 22. When the pairing signal is received by the infrared receiver 62 it is transmitted to the microprocessor 52. The microprocessor 52 processes the pairing signal and registers in the memory 54 that the set top box 24 is now paired with the remote control 22. The memory 54 may be flash memory, EEPROM, HDD, DRAM, SRAM, or any other suitable memory or circuitry for registering that the set top box 24 is coupled to the remote control 22.

In response to receiving the pairing signal, the set top box 24 also transmits an unpairing signal to a second set top box 26 (not shown). The radio frequency antenna 64 receives radio frequency control signals from the remote control 22 and transmits them to the microprocessor 52. The microprocessor 52 processes the control signals and checks memory 54 to determine if the set top box 24 is paired to the remote control 22 or unpaired from the remote control 22. If the set top box 24 is paired to the remote control 22 then the microprocessor 52 executes the request contained in the control signal. The request may be for example to access the DVR in order to display recorded content, to change the channel currently being displayed, or any other requests that a user of the set top box 24 may have. If the set top box 24 is not paired to the remote control 22, then the microprocessor 52 ignores the control signal and does not execute the requests contained therein.

In one embodiment upon receiving the pairing signal from the remote control 22, the microprocessor retrieves television programming codes from the memory 54 and transmits them to the remote control 22 by means of the infrared transmitter 60 or the radio frequency antenna 64. This allows for the remote control 22 to automatically be ready to control a television 36 coupled to the set top box 24 upon reception of the pairing signal by the set top box 24.

The set top box 24 is configured to be connected to satellite dish 34, a television 36, and the second set top box 26. The connection to the second set top box 26 may be a direct connection, or an indirect connection, for example by being connected to a satellite dish 34 which is also connected to the second set top box 26.

As well understood by those of skill in the art, a set top box 24 typically contains many more components than those shown in FIG. 5. Furthermore the components may be different than those shown in FIG. 5, or connected differently than shown in FIG. 5. The components shown in FIG. 5 are given by way of a simplified example. Those of skill in the art will understand, in view of the present disclosure, that there are many ways to implement a set top box 24 to utilize principles of the present disclosure other than those explicitly described herein. The set top box 24 of FIG. 5 is shown as a non limiting example of one embodiment.

In one embodiment the infrared pairing signal contains a unique identification code of the remote control 22. The identification code may be a unique MAC identification of the remote control 22. The infrared pairing signal informs the set top box 24 or 26 that receives it that a radio frequency pairing signal will be received shortly from the remote control 22. After transmitting the infrared pairing signal the remote control 22 transmits the radio frequency pairing signal. Both set top boxes 24 or 26 may receive the radio frequency pairing signal. However, only the set top box that received the infrared pairing signal will become paired with the remote control 22.

The radio frequency pairing signal also contains the unique identification code of the remote control 22. A set top box that did not receive the unique identification code of the remote control 22 contained in the infrared pairing signal will not accept the subsequent radio frequency pairing request containing the unique identification code of the remote control 22.

If for example the set top box 24 receives the infrared and radio frequency pairing signals, then the set top box 24 will transmit a radio frequency signal to the remote control 22. The radio frequency signal contains a unique identification code of the set top box 24. The remote control 22 receives the radio frequency signal from the set top box 24 and thereafter transmits the radio frequency control signals containing the unique identification code of the set top box 24. The set top box 24 receives the radio frequency control signals containing the unique identification code of the set top box 24 and executes the commands contained in the control signals. In this way the remote control 22 is paired to the set top box 24. In one embodiment every radio frequency control signal contains a unique identification code identifying the remote control 22 and a unique identification code identifying the intended recipient set top box 24, 26.

Figure 6:
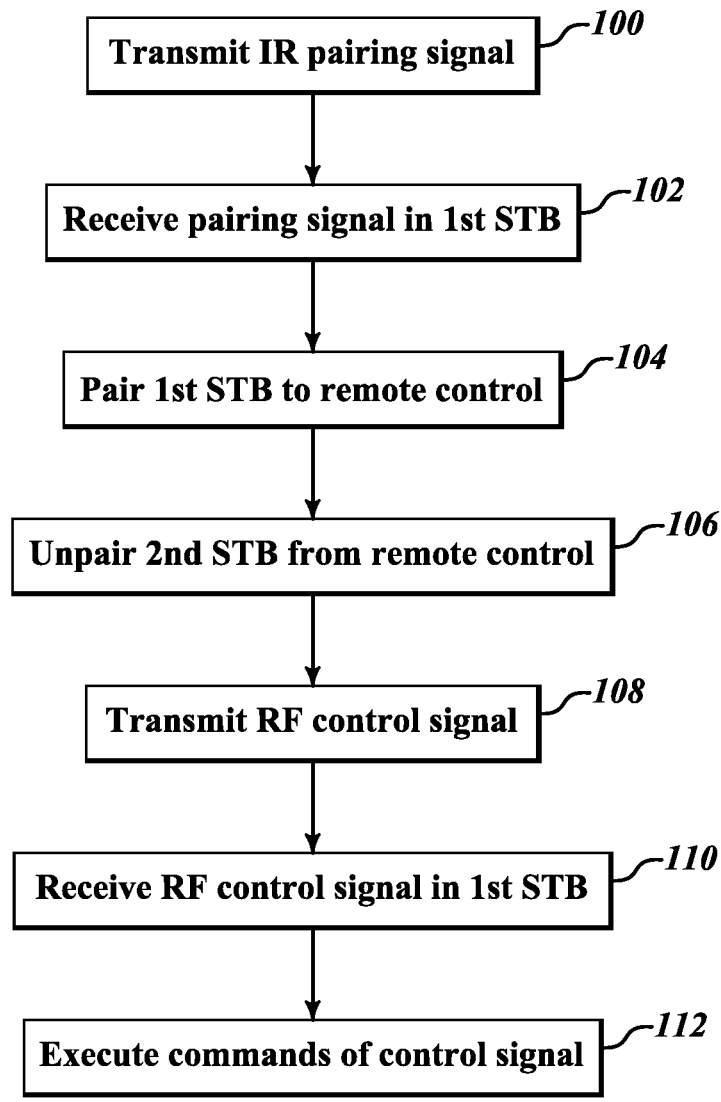
FIG. 6 illustrates a method for operating a remote control system according to one embodiment.

If the remote control 22 has been previously paired to the set top box 26, then upon receiving the radio frequency signal from the set top box 24 containing the identification code of the set top box 24 the remote control 22 sends a radio frequency unpairing signal containing the identification code of the set top box 26. The set top box 26 receives the unpairing signal from the remote control 22 and becomes unpaired from the remote control 22. Of course in other embodiments the set top box 26 may be unpaired from the remote control by receiving an unpairing signal from the set top box 24 or in any other suitable manner. FIG. 6 illustrates a process flow of a method for operating a system according to one embodiment. At 100 a remote control 22 transmits a pairing signal to a first set top box 24. At 102 to the first set top box 24 receives the pairing signal from the remote control 22. At 104 the first set top box 24 is paired to the remote control 22. This can happen by registering in a memory 54 of the first set top box 24 that the first set top box 24 is now paired to the remote control 22. At 106 the second set top box 26 is unpaired from the remote control 22 when the first set top box 24 becomes paired to the remote control 22. This can happen by the first set top box 24 transmitting an unpairing signal to the second set top box 26 or in any other suitable manner. The second set top box 26 may never have been paired to the remote control 22 and the reception of the unpairing signal may cause the second set top box 26 to register that it is not paired to the remote control 22 and that the first set top box 24 is paired to the remote control 22.

At 108 the remote control 22 transmits radio frequency control signals to control the first set top box 24. The first set top box 24 receives the control signals at 110 and checks the memory 54 to ensure that the first set top box 24 is paired to the remote control 22. If the first set top box 24 is paired to the remote control 22, then the first set top box 24 executes the commands of the control signal at 112.

Figure 7:
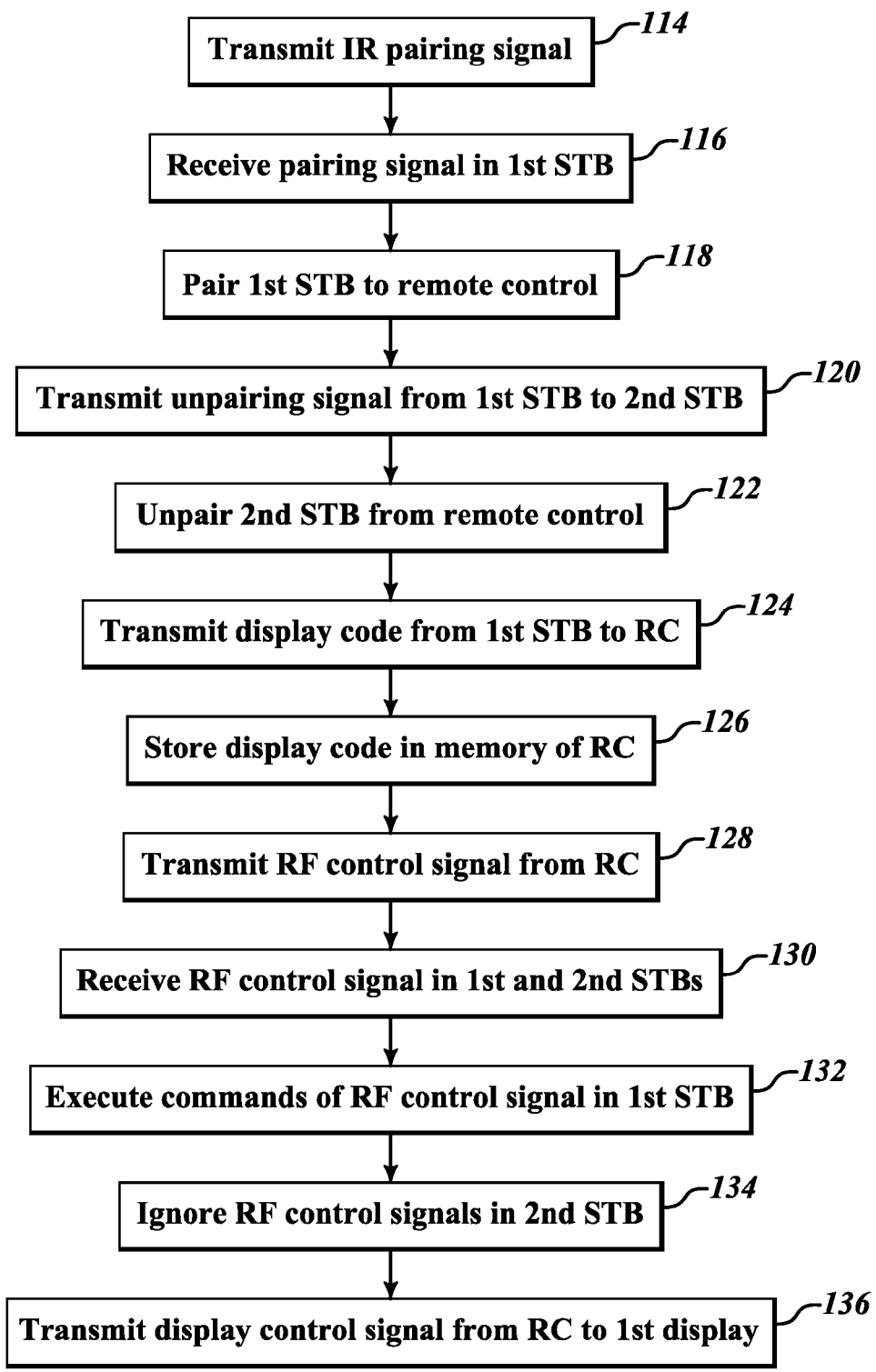
FIG. 7 illustrates a method for operating a remote control system according to one embodiment.

FIG. 7 illustrates a process flow chart for a method of operating a system 20 according to one embodiment. At 114 a remote control 22 transmits a pairing signal to a first set top box 24. At 116 to the first set top box 24 receives the pairing signal from the remote control 22. At 118 the first set top box 24 is paired to the remote control 22. This can happen by registering in a memory 54 of the first set top box 24 that the first set top box 24 is now paired to the remote control 22.

At 118 the first set top box 24 transmits an unpairing signal to a second set top box 26. At 106 the second set top box 26 receives the unpairing signal and becomes unpaired from the remote control 22. The second set top box 26 may never have been paired to the remote control 22 and the reception of the unpairing signal may then cause the second set top box 26 to register that it is not paired to the remote control 22 and that the first set top box 24 is paired to the remote control 22.

At 124 the first set top box 24 transmits a display programming code to the first set top box 24. The display programming code may contain a programming code for a remote control to control a television 36 coupled to the first set top box 24. At 126 the remote control stores the display programming code in memory so that it may control the television 36 coupled to the first set top box 24.

At 128 the remote control 22 transmits radio frequency control signals to control the first set top box 24. At 130 the control signals are received by the first set top box 24 and the second set top box 26. The first set top box 24 receives the control signals at 110 and checks the memory 54 to ensure that the first set top box 24 is paired to the remote control 22 and executes the commands of the control signal at 132. At 134 the second set top box checks to see if it is paired to the remote control 22, and upon finding that it is not paired to the remote control, it ignores the commands of the control signals. At 136 the remote control 22 transmits display control signals to the television 36, for example to turn on the power of the television 36, to turn up the volume of the television 36, or to switch the inputs of the television 36. Because the first set top box 24 transmitted the display programming signal to the remote control 22, the remote control 22 is ready to control the television without any additional input from the user.

The processes described in relation to FIGS. 6 and 7 are given by way of non-limiting example only. There may be more or fewer process steps in a process for pairing a remote control 22 to a set top box 24 than described in relation to FIGS. 6 and 7. In some embodiments there may be radio frequency and infrared pairing signals transmitted from the remote control as described previously. The remote control 22 and set top boxes 24, 26 may issue identification codes in infrared and radio frequency signals as described previously. Many other embodiments are possible as will be apparent to those of skill in the art in light of the present disclosure.

In one embodiment there may be many set top boxes. The unpairing signal may be selectively configured to unpair some, but not all of the set top boxes. For example, if there are ten set top boxes, the remote may be paired to a subgroup of these, for example, seven of them, and unpaired from the rest. Subsequently, it can be paired to a different group, such as three or five set top boxes, and unpaired from the rest.

In some locations there may be many televisions each connected to a respective set top box. It may be desirable to have a first group of set top boxes all provide the same content to their respective televisions, and a second group of set top boxes all provide the same content to their respective televisions. In such an embodiment pairing the remote control to any of the set top boxes in the first group will automatically pair the remote control to all set top boxes in the first group while simultaneously unpairing all of the set top boxes of the second group from the remote control. In one embodiment the remote control may be paired to control banks of dozens of set top boxes within its range, and unpaired from any other set top boxes which it is desired to not control even though they are within its range.

The various embodiments described above can be combined to provide further embodiments. These and other changes can be made to the embodiments in light of the above-detailed description. For example, while the pairing signal and the control signals have been described as being issued in different frequency bands, in one embodiment the pairing signal is issued in the same frequency band as the control signals, but the pairing signal is transmitted at a much lower power than the control signals so as to only be received by one of the set top boxes 24, 26. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
    transmitting a pairing signal in an infrared frequency band from a remote control;
    transmitting command signals from the remote control in a radio frequency band;
    receiving the pairing signal in a first set top box;
    unpairing the remote control from a second set top box in response to reception of the pairing signal by the first set top box by causing the first set top box to transmit a signal to the second set top box, the second set top box configured upon receipt of the signal to no longer execute command signals received by the second set top box from the remote control in the radio frequency band; and
    pairing the remote control to the first set top box in response to reception of the pairing signal by the first set top box by causing the first set top box to execute command signals received from the remote control in the radio frequency band.

2. The method of claim 1 wherein unpairing the remote control from the second set top box comprises transmitting an unpairing signal from the first set top box to the second set top box in response to reception of the pairing signal by the first set top box.

3. The method of claim 1 further comprising:
    pairing the remote control to a display coupled to the first set top box upon reception of the pairing signal by the first set top box; and
    transmitting display control signals from the remote control to control the display when the remote control is paired to the display.

4. The method of claim 3 wherein pairing the remote control to the display comprises:
    transmitting a display code from the first set top box to the remote control; and
    storing the display code in a memory of the remote control.

5. The method of claim 3 comprising transmitting video signals from the first set top box to the display.

6. The method of claim 5 wherein the display is a television.

7. The method of claim 1 wherein transmitting the pairing signal comprises transmitting an identity code of the remote control.

8. The method of claim 7 wherein the pairing signal is encrypted.

9. A set top box comprising:
    an infrared signal receiver configured to receive an infrared pairing signal from a remote control;
    a processing circuit configured to process the pairing signal and to pair the set top box to the remote control; and
    a radio frequency signal receiver configured to receive radio frequency control signals from the remote control, the processing circuit configured to allow the control signals to control the set top box when the set top box is paired to the remote control, and to transmit an unpairing signal to a second set top box upon reception of the pairing signal, the unpairing signal configured to unpair the second set top box from the remote control.

10. The set top box of claim 9 wherein the control circuit is configured to pair the remote control to a television in response to receiving the pairing signal.

11. The set top box of claim 10 comprising a memory configured to store a television control code, the set top box configured to transmit the television control code to the remote control upon receiving the pairing signal.

12. A system comprising:
    a remote control having:
        an infrared transmitter configured to transmit an infrared pairing signal; and
        a radio frequency transmitter configured to transmit a control signal;
    a first set top box including:
        a first infrared receiver configured to receive the pairing signal; and
        a first radio frequency receiver configured to receive the control signal;
    a second set top box having:
        a second infrared receiver configured to receive the pairing signal; and
        a second radio frequency receiver configured to receive the control signal, the first set top box configured to pair the remote control to the first set top box and to transmit an unpairing signal to the second set top box that unpairs the remote control from the second set top box upon reception of the pairing signal by the first set top box, the first set top box being further configured to be controlled by the control signal when the remote control is paired to the first set top box.

13. The system of claim 12 wherein the first set top box is configured to output video signals to a display.

14. The system of claim 13 wherein the first set top box comprises a first memory configured to store a display control code and to transmit the display control code to the remote control upon receiving the pairing signal.

15. The system of claim 14 wherein the remote control has a second memory configured to store the display control code, the remote control being configured to transmit display control signals to control the display.

16. The system of claim 15 wherein the display is a television.

17. The system of claim 12 comprising a satellite antenna coupled to the first and the second set top boxes.

18. A method comprising:
    transmitting a pairing signal from a control unit, the pairing signal being in an infrared frequency band;
    receiving the pairing signal in a first processing unit;
    pairing the control unit to the first processing unit upon reception of the pairing signal by the first processing unit;
    transmitting an unpairing signal from a first processing unit to a second processing unit upon reception of the pairing signal by the first processing unit;

unpairing the control unit from the second processing unit upon reception of the unpairing signal by the second processing unit; and transmitting a control signal from the control unit, the control signal being in a radio frequency band, the first processing unit being configured to be controlled by the control signal when the control unit is paired to the first processing unit, the second processing unit being configured to be controlled by the control signal while the second processing unit is paired to the control unit and to not be controlled by the control signal while the second processing unit is not paired to the control unit.

\* \* \* \* \*